(No Model.)

T. G. GILFILLAN.
SAFETY CAR.

No. 366,828. Patented July 19, 1887.

WITNESSES:
George Binkenburg
C. Sedgwick

INVENTOR:
T. G. Gilfillan
BY Munn & Co.
ATTORNEYS.

UNITED STATES PATENT OFFICE.

THOMAS G. GILFILLAN, OF UNION, OREGON.

SAFETY-CAR.

SPECIFICATION forming part of Letters Patent No. 366,828, dated July 19, 1887.

Application filed May 16, 1887. Serial No. 238,396. (No model.)

*To all whom it may concern:*

Be it known that I, THOMAS G. GILFILLAN, of Union, in the county of Union and State of Oregon, have invented a new and Improved Safety-Car, of which the following is a full, clear, and exact description.

The object of the invention is to provide a car from which escape can easily be made in case of accident.

Reference is to be had to the accompanying drawings, forming a part of this specification, in which similar letters of reference indicate corresponding parts in all the figures.

Figure 1:
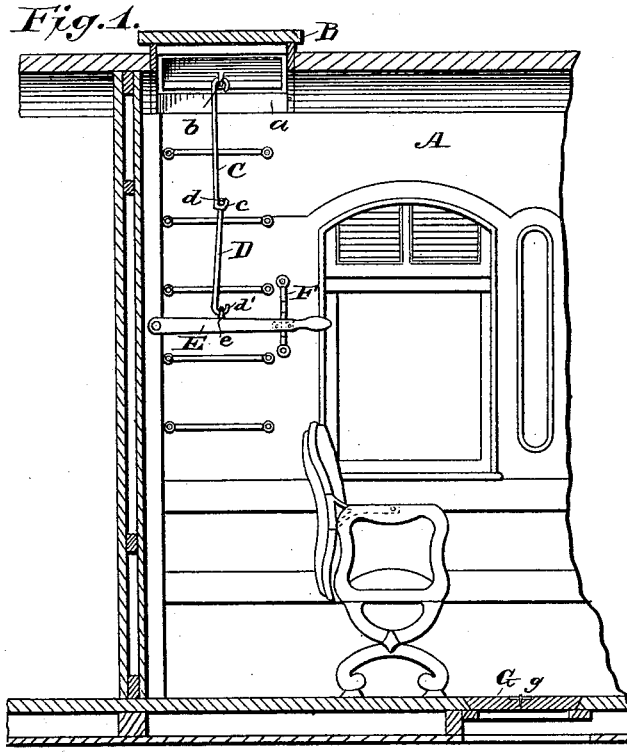
Figure 2:
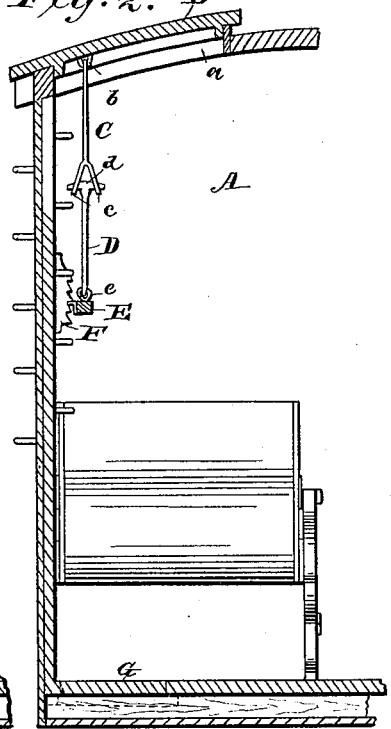
Figure 3:
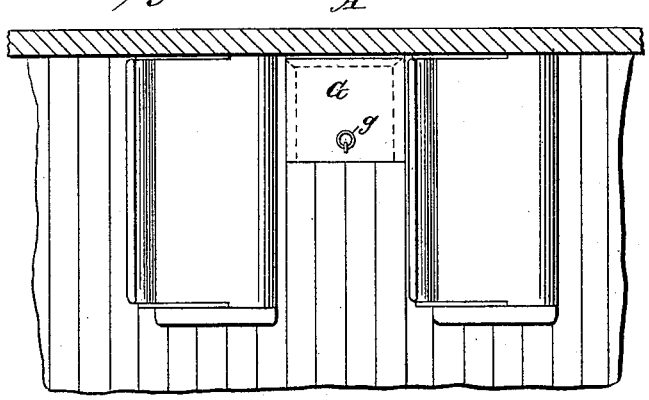
Figure 4:
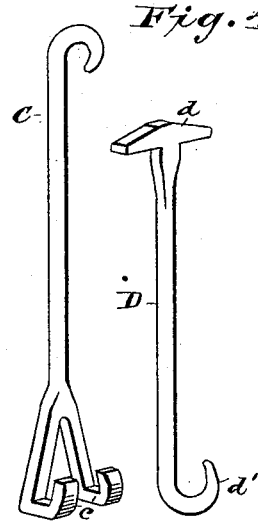

Figures 1 and 2 are vertical sectional elevations, at right angles to each other, of a section of a car embodying my invention. Fig. 3 is a plan view of a section of a car, showing a trap-door in the bottom thereof; and Fig. 4 is an enlarged detail view.

In the roof of the car A, I form openings $a$—say four in number—each of which is closed by a trap-door, B, fitting water-tight, and on the inside of each door B is secured an eye, $b$, to receive the upper hooked end of a bar, C, the upturned lower end, $c$, of the said bar being forked. Fitting in the upturned forked end of the bar C is the head $d$ of another bar, D, the lower end of the bar $d$ being formed with a hook, $d'$. An eye, $e$, secured to or formed upon a hand-lever, E, receives the lower hooked end of the rod D, the said lever being fulcrumed at its end on the side of the car, and adjacent to the lever E on the side of the car is a vertical toothed bar, F, with which the said lever engages.

When the lever E is engaged by the toothed bar F, the door B is securely held in place; but upon being released therefrom the lever may be raised, which will cause the lower bar, D, to be disengaged from the lower forked end of the bar C and allow the trap door B to be raised or removed.

At each opening $a$ are fixed, on both the inside and outside of the car, iron steps or rails F, similar to those now used on the outside of freight-cars.

There may be as many openings $a$ in the car as desired, so that all the passengers may quickly make their escape in case of accident.

The unlocking of the trap-door is so very simple that the operation will be readily apparent to even the most ignorant.

In addition to the openings in the roof, I provide the bottom of the car with trap-doors G, beveled on three sides, as shown, and provided with rings $g$, or other convenient means for removing them. These doors G fit in correspondingly-beveled openings in the car-floor, and in practice will be conspicuously labeled to indicate their purpose.

In case of collision, the doors F will be displaced by the shock, owing to their beveled form.

By this construction of car a means of exit is provided, no matter in what position the car may be thrown.

Having thus fully described my invention, I claim as new and desire to secure by Letters Patent—

1. The combination, with a railroad-car having an opening in its roof, and with the door or cover of said opening, of the locking-bars C D, loosely connected together, the lever E, and toothed bar F, substantially as shown and described.

2. The combination, with a car having an opening in its roof, and with the cover or door of said opening, of the bar C, secured to said door and formed at the bottom with an upturned forked end, $c$, the bar D, formed with a head, $d$, fitting the forked end of bar C, and a lever, E, for disengaging the bar D from the bar C, substantially as shown and described.

THOMAS G. GILFILLAN.

Witnesses:
 JAMES A. EAKIN,
 R. EAKIN.